United States Patent
Tsao et al.

(10) Patent No.: US 7,196,731 B2
(45) Date of Patent: Mar. 27, 2007

(54) METHOD AND APPARATUS OF ADAPTIVE DE-INTERLACING OF DYNAMIC IMAGE

(75) Inventors: Sheng-Che Tsao, Taipei (TW); Jackie Hsiung, Taipei (TW); An-Te Chiu, Taipei (TW)

(73) Assignee: Via Technologies, Inc. (TW)

( * ) Notice: Subject to any disclaimer, the term of this patent is extended or adjusted under 35 U.S.C. 154(b) by 493 days.

(21) Appl. No.: 10/851,240

(22) Filed: May 24, 2004

(65) Prior Publication Data

US 2004/0233328 A1 Nov. 25, 2004

(51) Int. Cl.
H04N 7/01 (2006.01)

(52) U.S. Cl. ...................... 348/448; 348/452

(58) Field of Classification Search .............. 348/448, 348/441, 451, 452, 458, 459
See application file for complete search history.

(56) References Cited

U.S. PATENT DOCUMENTS 6,108,047 A * 8/2000 Chen .......................... 348/448
6,330,032 B1 * 12/2001 Boehlke ...................... 348/452
7,129,987 B1 * 10/2006 Westwater ................. 348/441

* cited by examiner

Primary Examiner—Sherrie Hsia

(57) ABSTRACT

The present invention provides a method and apparatus of adaptive de-interlacing of dynamic image, configured for calculating characteristic values of each line segment of current frame in sequence according to width of line segment. Next, calculating the difference between characteristic values of each line segment of current frame and characteristic values of each corresponding line segment of reference frame in sequence to acquire an image shift value of line segment. And next, comparing the image shift value of line segment with a threshold to determine a de-interlacing algorithm for executing the de-interlacing and constituting a high-resolution dynamic image. At the same time, storing characteristic values of each line segment of current frame for being the characteristic values of each corresponding line segment of the former frame when calculating the image shift value of line segment of the next frame. By adjusting width of line segment and a threshold, it can control which kind of de-interlacing for using and information amount of each de-interlacing process to acquire good image quality of dynamic image and elasticity of operation.

20 Claims, 7 Drawing Sheets

FIG.4A

Reference frame

| 33 | 8 |
|---|---|
| 20 | 28 |
| 16 | 32 |
| 14 | 20 |

Current frame

| 45 | |
|---|---|
| | |
| | |
| | |

FIG.4B

Current frame
Threshold=10

| 12 | |
|---|---|
| | |
| | |
| | |

FIG.4C

Reference frame

| 45 | 8 |
|---|---|
| 20 | 28 |
| 16 | 32 |
| 14 | 20 |

Current frame

| B | |
|---|---|
| | |
| | |
| | |

FIG.4D

Current frame
Threshold=10

| 12 | 7 |
|----|----|
| 4  | 3  |
| 6  | 20 |
| 6  | 12 |

FIG.4E

Reference frame

| 45 | 15 |
|----|----|
| 24 | 31 |
| 22 | 12 |
| 18 | 8  |

Current frame

| B | W |
|---|---|
| W | W |
| W | B |
| W | B |

FIG.4F

METHOD AND APPARATUS OF ADAPTIVE DE-INTERLACING OF DYNAMIC IMAGE

BACKGROUND OF THE INVENTION

1. Field of the Invention

This present invention generally relates to a method and apparatus of de-interlacing of dynamic image, and more particularly to a method and apparatus of adaptive de-interlacing of dynamic image, wherein the dynamic image taking a line segment composed of pixels as a unit for calculating and determining the process.

2. Description of the Prior Art

As information technology develops, analog products have been gradually replaced by digital products, thus there are more and more video/audio players and display systems including the function of transmitting analog signals to digital signals. There are two kinds of scanning standard of analog television at present, i.e. National Television System Committee (NTSC) and Phase Alternation by Line (PAL). Standard of NTSC is used in Japan or the US, according to which a frame is formed by 525 scanning lines i.e. 525 scanning lines are called a frame, which means the frame is displayed repeatedly at the speed of 30 frames per second. Yet 525 scanning lines that form a frame are not finished in only one scanning. The frame is displayed by scanning one line and then the line following the next line. In other words, after the first line is scanned, the third line is scanned rather than the second line, and then the fifth, seventh, to the $525^{th}$ line respectively. Then the scanning process returns to the second line and repeats, in the following are the fourth, sixth, eighth, etc. Therefore the smooth and clear frame displayed is actually constituted by an odd number, an even number, and then an odd number, the formatting method of which is called "double-space scanning" or "interlacing".

An interlaced video signal is composed of two fields, each of the two fields containing odd lines or even lines of the image. In the process of image capture, camera will output odd lines of image on instant basis and output even lines of image after 16.7 milliseconds. Since a temporal shift will occur in the process of outputting odd lines and even lines of the image, the temporal shift should be positioned in the system of frame-based processing. For a still frame, a good one can be acquired with this method, whereas the image will become blurred since serration will occur on the edge of the image called feathering for a frame with motion pictures. Besides, since field of odd lines and field of even lines are formed by only half amount of scanning lines (262.5 lines), each field of odd lines and field of even lines only has half of the resolution of the original image. Moreover, even though each field of odd lines and field of even lines displays at the speed of 60 fields per second and such frame may not appear to have motion artifacts, but if the frame is enlarged, the scanning lines will appear thick and the frame will become blurred.

The disadvantages of "interlacing scanning" described above can be eliminated by a technique called "progressive scan". In progressive scan, the first, second, third, to the $525^{th}$ line are scanned in order and displayed at the speed of 60 frames per second. Therefore its scanning speed is twice the scanning speed of "interlacing" and the frame is displayed on the monitor with 525 scanning lines, which makes the frame fine and clear, which being the best merit of "progressive scan". Therefore, most of the developed video/audio equipment at present has used this method for scanning and displaying.

However, current video signal of NTSC system uses mainly the method of "interlacing" so far. Therefore, if a frame constituted by interlacing is displayed by a display system using a progressive scan, for instance, when a DVD film edited by interlacing is directly broadcast and displayed on HDTV, only frame of odd lines and frame of even lines can be displayed and the resolution of image will be worse. To solve this problem, the technique of "de-interlacing" should be used. In other words, de-interlacing is a method to convert interlacing to a progressive scan. For example, to convert standard definition TV (SDTV) to high definition TV (HDTV), the scanning lines are enhanced from 480i to 720p by the steps of de-interlacing and resampling, and the misalignment of image occurred during combination of odd and even scanning lines should be amended so that a progressive image can satisfy the demands of the audiences.

Although the technique of de-interlacing can solve the problem that interlacing system is displayed on progressive scan system with poor resolution, yet another problem that cannot be neglected is that we can only obtain clear image in the case of a still frame but blurred image and motion artifacts in the case of a frame with motion and thus high image quality cannot be displayed. In General, there are non-motion compensated algorithms and motion-compensated one for solving the problem described above.

1. Non-Motion Compensated De-Interlacing Algorithm

Two basic linear transformation techniques of non-motion compensated de-interlacing algorithms are called "Weave" and "Bob", wherein "Weave" overlaying (or woven together) two input fields to produce a progressive frame. Although the different image fields can be fully aligned in the processing of a still image in this technique and a clear de-interlaced image can be produced, yet, obvious serration or feathering will occur since the image with motion will shift as time goes by. And therefore, when image of odd lines and image of even lines are woven into one frame, misalignment of image will occur since there is a temporal shift between image of odd lines and image of even lines. Therefore there will be serration or feathering and thus produces a blurred frame, as shown in FIG. 1. Besides, since "Bob" only accept one of fields of input images (for example, image of even lines), and the other fields (i.e. image of odd lines) are discarded, the vertical resolution of the image will decrease from 720×486 to 720×243 pixels. The voids of the discarded lines are filled in by adjacent scanning lines in this image with only half of the resolution in order to regain the resolution of 720×486 pixels. The merit of Bob algorithm is that it can eliminate motion artifacts of image and decreases calculation demands, and the disadvantage is that the vertical resolution of input image is still half of the original image after interpolating, which causes the detail resolution of progressive scan image to decrease.

2. Motion Compensated De-Interlacing Algorithm

Because the method of motion compensation in technique of MPEG compression is used for the motion compensation of de-interlacing algorithm, thus we illustrate briefly the technique at first. In dynamic video compression technique, compressed method of MPEG is used in practice at present, MPEG being abbreviation of motion pictures experts group. The editing standards of which can be divided into three parts: video, audio, and system. In a continually broadcast motion picture, there is high relevance between the former picture and the latter one, therefore in a series of original motion picture sequences, there is high spatial relevance and high temporal relevance between the former picture and the latter one, and video compression is processed by removing redundant information to achieve the purpose of compression according to the relevance of these two kinds of information. The method of removing spatially redundant information is usually processed, according to the characteristic of human vision, with spatial transformation (such as discrete cosine transform i.e. DCT or wavelet transform) and quantization to filter and remove the part of high frequency to achieve compression. As for removing temporally redundant information, principle of Motion Estimation is used to find out and remove temporally redundant information to achieve compression.

In the process of MPEG compression (or encoding), three different methods are used to compress each frame: Intraframe (I-frame), Bi-directional frame (B-frame) and Predicted frame (P-frame), wherein the I-frame does not need to put its relation with other frames under consideration since a complete frame is saved. P-frame takes former I-frame as reference frame, wherein the redundant part of frame is not saved and only different part of frame is saved. The principle of B-frame is the same as that of P-frame, the only difference being that B-frame can take former I-frame or P-frame as reference and can also take latter P-frame as reference.

In I-frame, it usually cuts a frame as macro block of a 16×16 pixel for processing. Each macro block is composed of a luminance block (i.e. Y block) of four 4×4 pixels, a $C_r$ block of one 8×8 pixel and a $C_b$ block of one 8×8 pixel.

In P-frame, the data should be saved is mainly the difference between current frame and reference frame, wherein the reference frame is the former I-frame or P-frame. That's because any parts of the same frame can often be found in some position of the former frame, only recording those parts shifted from parts of the former frame and thus reducing much the information of frame required of saving, and the technique is called motion compensation. In P-frame, it also takes macro block as a unit. Normally, each macro block can find the closest block of the macro block within some region. The procedure is called block matching, and coordinates of the comparative position of the current frame are (0, 0). When the macro block finds the nearest block by contrast, only the displacement of coordinates of the macro block in two frames is recorded, i.e. (displacement of x, displacement of y) and is shown as (dx, dy), which is so-called motion vector (MV). The principle of B-frame is the same as the principle of P-frame except that B-frame can take former I-frame or P-frame as a reference (it can also take latter P-frame as a reference and take the average of both two as a reference).

When the image is de-compressed (i.e., when it is broadcast), it is processed in an order opposite to that of encoding, and the signal of frequency domain would be converted to spatial signal to transform the signal back into data stream before compression, and these data streams are then integrated and sent to video reconstructed image buffer (or video image buffer), which restores received data to original frames. Besides, when the first one is I-frame, restoring directly and saving the latter frames by memory. Finally, restoring those frames only recording difference to the situation before compression by the method of motion compensation.

As is described above, motion compensation comprising pixels of two temporal shift fields being shifted to a common point in one instant and forming a frame. Motion estimation is consulted for deciding the shifting amount of each pixel, wherein identification and tracking of motion vector is from one field (for example, field of odd lines) to another field (for example, field of even lines). Otherwise, it is configured for cutting the fields into a plurality of macro blocks further and executing by the procedure of block matching. Moreover, when taking a macro block as identification of motion vector, actually it only chooses the luminance block (i.e. Y block) of the macro block for executing, and discards the saturation block (i.e. $C_r$ block and $C_b$ block). The main reason is that human's eyes is sensitive to the change of luminance and is less sensitive to the change of saturation respectively. Therefore under the requirement of reducing the processing amount of data, in the process of MPEG compression (or encoding), only taking the luminance block as the basis of identification of motion vector.

Current multi-functions DVD is edited by images of film using interlacing scanning, therefore interlacing constitutes a frame when it is broadcast. Thus, when a film is broadcast by the hi-fi digital TV, we should choose a method of Weave or Bob for broadcast to convert interlacing scanning to progressive scan. However, when we choose the Weave method for broadcast, misalignment of image will occur since there is a temporal shift between image of odd lines and image of even lines. Therefore there will be serration or feathering and thus produces a blurred frame. When we choose the Bob method for broadcast, although the misalignment of image will be overcome and a clear and natural dynamic image can be produced, the vertical resolution of a still image will be sacrificed. It's therefore that, between current video/audio player system and digital display system, we cannot give consideration to the image quality of a frame with motion and a still frame when processing de-interlacing.

Besides, in the process of editing a VCD or DVD film, in accordance with some video/audio which uses standard of Joint Photographic Experts Group (JPEG) or those films edited by using I-frame of MPEG compressing standard in one disc and films without compression, dynamic image might only include encoding information of I-frame or only include information of dynamic image, and it cannot detect motion vector when playing such kind of film in the video/audio player system and therefore encoding incompatible problem occurs. Consequently, it cannot play such kind of film without vector of motion in the player system and it's not convenient for users. Besides, in accordance with a video/audio player system without providing a selection mechanism, when it's restricted for the limit of hardware performance such as insufficient memory or not enough bandwidth, the de-interlacing algorithm in the hardware system required for more requirements cannot execute. And it cannot display with the best image quality for lack of the selection mechanism of de-interlacing algorithm.

SUMMARY OF THE INVENTION

The present invention provides a method and apparatus of adaptive de-interlacing of dynamic image, wherein the dynamic image taking a line segment composed of pixels as unit comprising the steps of calculating characteristic values of each line segment taking width of the line segment as a process unit of the current frame in sequence in accordance with width of a line segment which takes the pixels as a unit; calculating an image shift value of line segment in sequence in accordance with the characteristic values of each line segment of the current frame and the characteristic values of each corresponding line segment of the reference frame; comparing the image shift value of line segment with a threshold for determining a de-interlacing algorithm of the dynamic image; and executing the determined de-interlacing algorithm for constituting output image of the dynamic image.

The present invention also provides an apparatus of adaptive de-interlacing of dynamic image comprising a calculating unit of characteristic values for receiving width of a line segment, calculating and then outputting characteristic value of a line segment of the current frame of the dynamic image; a calculating unit of image shift value of line segment for receiving the characteristic value of the line segment of the current frame and the characteristic value of a corresponding line segment of a reference frame, calculating and then outputting an image shift value of line segment; a determining unit for receiving and comparing the image shift value of line segment with a threshold, and then outputting information of determination; and a processing unit of video images for receiving the information of determination, choosing and executing a de-interlacing algorithm according to the information of determination, and then outputting a dynamic image completing de-interlacing process.

According to this, the method and apparatus of adaptive de-interlacing of dynamic image of the present invention can solve some problems. For instance, we can give consideration to image quality of a frame with motion and a still frame when processing de-interlacing between current video/audio player system (for instance, a VCD player or DVD player) and digital display system (for instance, HDTV or plasma TV). Therefore, producing higher-resolution images and satisfying the requirement of quality of audio/video player for users.

BRIEF DESCRIPTION OF THE DRAWING

FIG. 1 schematically shows the diagram of de-interlacing of prior art, wherein

FIG. 4 schematically shows the diagram of the calculation method of image shift value of line segment.

DESCRIPTION OF THE PREFERRED EMBODIMENT

Since the related techniques and methods of compression standard and encoding have been described in detail in prior art; therefore the complete process of these techniques and methods is not included in the following description. Moreover, the art of encoding and decoding used in the present invention adapted from MPEG compressing technique is quoted in summary here to support the description of the invention. And the block diagrams in the following text are not made according to relative position in reality and complete connection diagram, the function of which is only to illustrate the features of the invention.

Figure 1B:
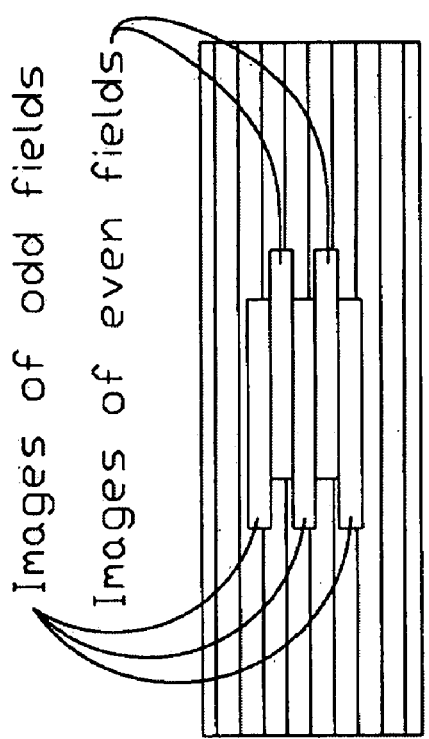
FIG. 1A is the diagram of de-interlacing images without motion and FIG. 1B is the diagram of de-interlacing images with motion.
Figure 1A:
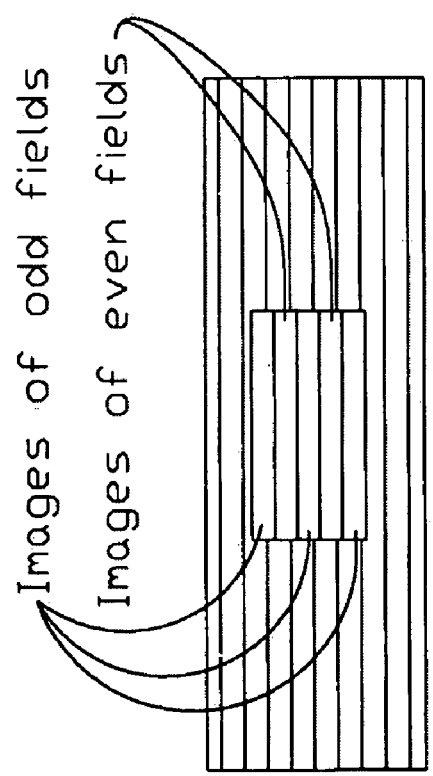
Figure 2:
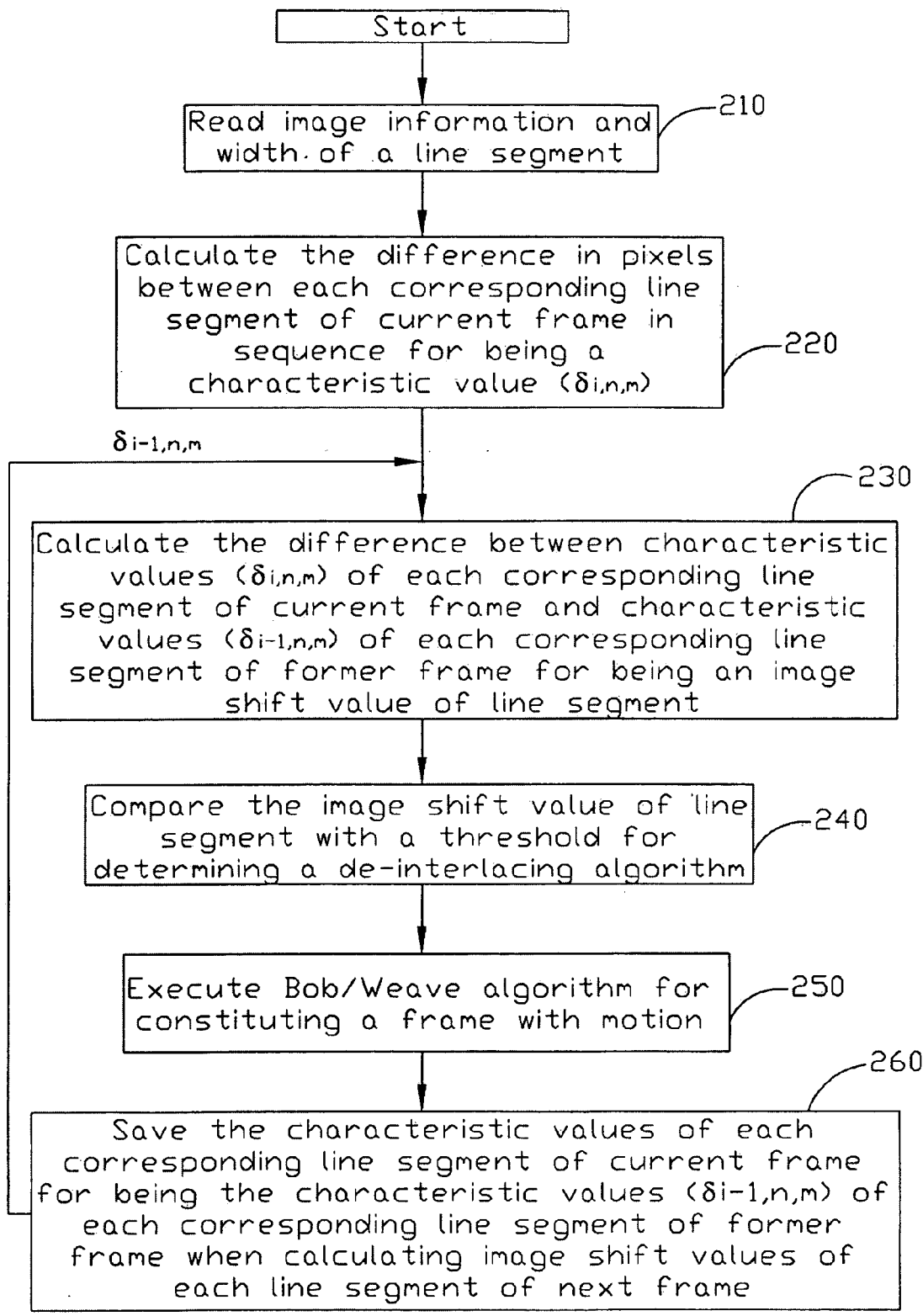
FIG. 2 schematically shows the flow chart of adaptive de-interlacing of the present invention.

FIG. 2 schematically shows the flow chart of adaptive de-interlacing of the present invention. In step 210, reading image information of a dynamic image and receiving width of a line segment for being a common base of image processing, wherein the width of a line segment is composed of Y values of each pixel within an image. Next, in step 220, calculating the difference in pixels between each line segment corresponding to width of the line segment of current frame in sequence (i.e. difference of Y value) for being characteristic value ($\delta_{i,n,m}$) of a line segment. And the calculation formula is shown as equation 1:

$$(\delta_{i,n,m}) = DIF(i:n:m) = \sum_{k=1}^{j} |ODD(n)\_LINESEG(m)\_PIX(k) - EVEN(n+1)\_LINESEG(m)\_PIX(k)| \quad (1)$$

wherein i represents current frame; n represents scanning lines of frame; m represents the $m^{th}$ line segment of the line; j represents width of line segment (taking pixels as a unit) and the width is adjustable; and k represents position of a pixel in the line segment.

The calculation method of equation 1 is that between a line segment of a line (for instance, the $1^{st}$ line i.e. the $n^{th}$ line) within odd fields of a frame and a line segment corresponding to width of a chosen line segment of the $2^{nd}$ line (i.e. the $n+1^{th}$ line) within even fields (for instance, width of a line segment composed of 4 pixels, i.e. j=4 and k=1~4), calculating the difference in Y values of relative pixel position within adjacent lines between two fields in sequence and then getting absolute value of the difference. Then, adding those absolute values of each difference of Y value for being a characteristic value ($\delta_{i,n,m}$) of the line segment. After acquiring the characteristic value ($\delta_{i,n,m}$) of the line segment, then processing calculation of the image shift value of line segment in step 230, wherein the calculation is that subtracting a characteristic value ($\delta_{i-1,n,m}$) of a line segment that has the same width of line segment and the same position of pixels as the former frame from the characteristic value ($\delta_{i,n,m}$) of a line segment of current frame acquired by step 220 for being an image shift value of line segment. In the following, comparing the image shift value of line segment with a threshold, wherein the threshold is adjusted by the requirement of image quality, the performance of player system and requirement of memory space. In other words, the threshold is a programmable threshold. Further, when the comparison result in step 240 shows that the image shift value of line segment is substantially greater than the threshold, then step 250 chooses Bob algorithm for de-interlacing process. Similarly, when the comparison result in step 240 shows that the image shift value of line segment is substantially less than the threshold, then step 250 chooses Weave algorithm for de-interlacing process. Moreover, saving the characteristic value ($\delta_{i,n,m}$) of the line segment. Consequently, continually processing each line segment by the procedure of de-interlacing algorithm in sequence for constituting a dynamic image with de-interlacing process already completed.

Figure 3:
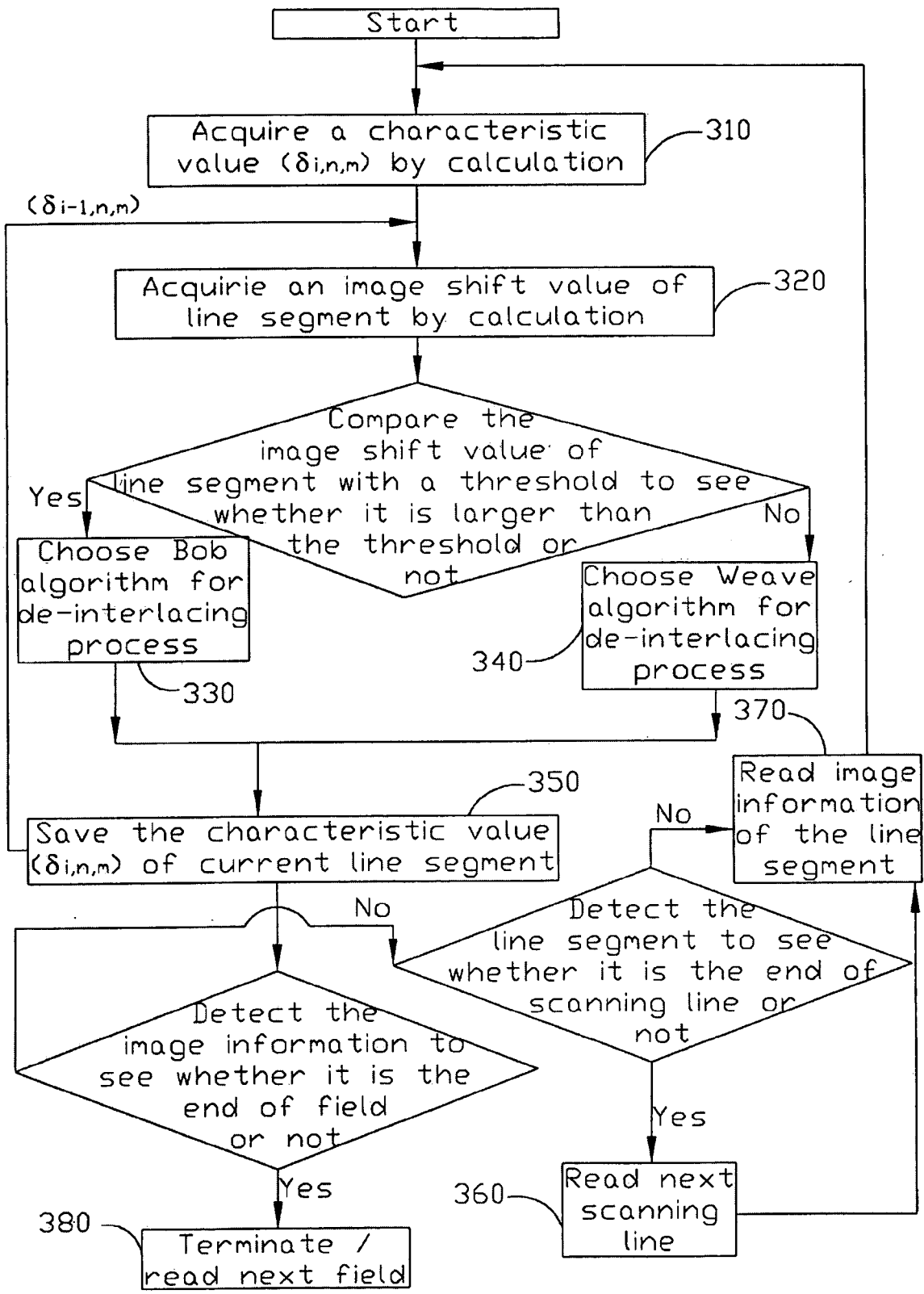
FIG. 3 schematically shows the flow chart of one embodiment of adaptive de-interlacing of the present invention.
Figure 4A:
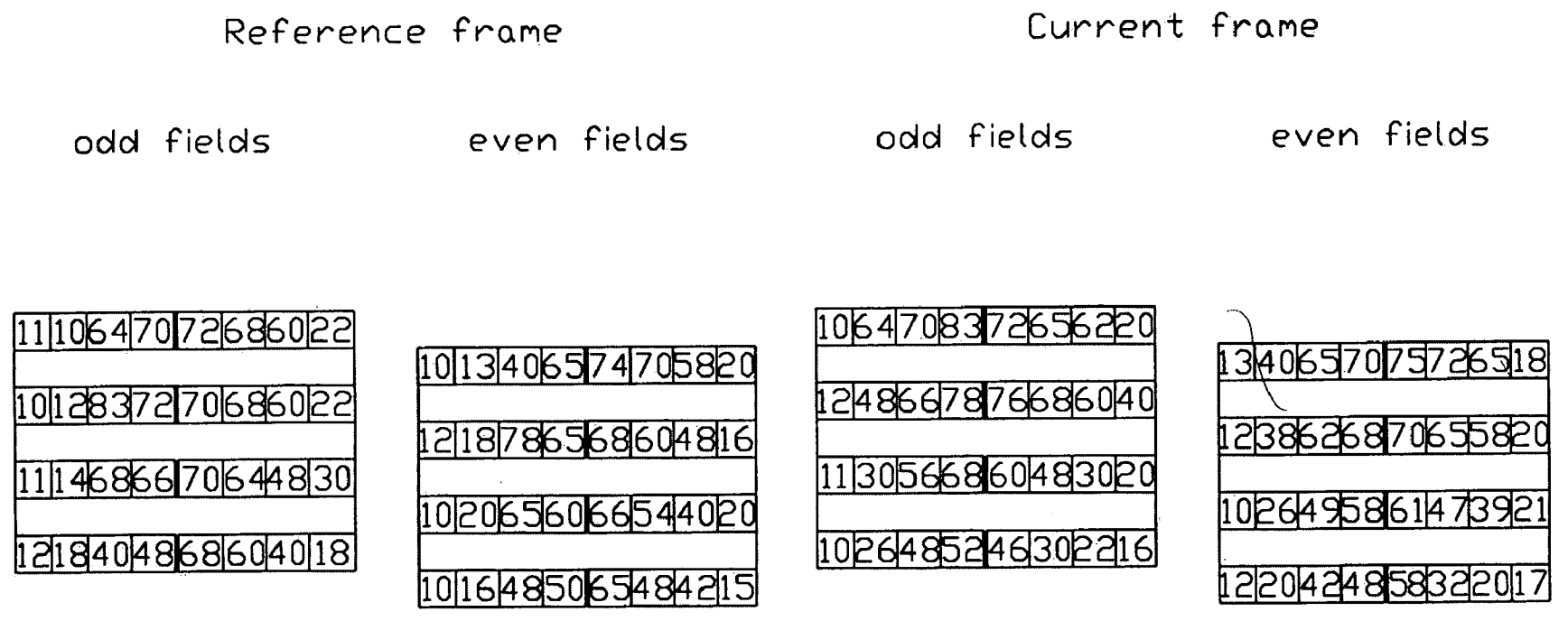

FIG. 3 and FIGS. 4A–4F depicting one specific embodiment of the present invention, wherein FIG. 3 schematically shows the flow chart of line segment-based adaptive de-interlacing of the present invention; while FIGS. 4A–4F schematically show the diagram of the calculation procedure of line segment-based adaptive de-interlacing of the present invention. Moreover, the image resolution of the frame in FIG. 4 are 8×8 pixels. When a player system provides readable image information and width of a line segment, for instance reading the image information of current frame with width of the line segment is 4; and then Y values of the $1^{st}$ to the $4^{th}$ pixels of a line segment in odd fields of the frame read and Y values of the $1^{st}$ to the $4^{th}$ pixels of a line segment in even fields of the frame are (10, 65, 70, 83) and (13, 40, 65, 60) respectively. Besides, Y values of pixels of other line segments in odd fields and even fields of the frame are as shown in FIG. 4A. Next, in step 310, calculating the characteristic value ($\delta_{i,n,m}$) of the $1^{st}$ line segment of current frame by the formula in equation 1, wherein the calculation process and the result are:

$$\delta_{i,n,m} = \Sigma(10-13+64-40+70-65+83-70) = 45$$

Referring to FIG. 4B, the characteristic value ($\delta_{i,n,m}$) of the $1^{st}$ line segment of current frame is 45, wherein the reference frame in FIG. 4B is composed of the characteristic values of each line segment of the former frame. Next, in step 320, getting absolute value of subtracting the characteristic value ($\delta_{i-1,n,m}$) of the $1^{st}$ line segment of the former reference frame from the characteristic value ($\delta_{i,n,m}$) of the $1^{st}$ line segment of current frame for being the calculation result of the image shift value of line segment. At this time, the image shift value of $1^{st}$ line segment of current frame is 12 (i.e. 45–33), referring to FIG. 4C. Next, comparing the image shift value of line segment with a programmable threshold. When the threshold is 10, thus the image shift value of $1^{st}$ line segment of current frame is greater than a $1^{st}$ threshold, taking the line segment as a motion line segment with displacement and then Bob algorithm is chosen for de-interlacing process in step 330. And next, in step 350, saving the characteristic value ($\delta_{i,n,m}$) of a line segment of current frame into the position of the characteristic value of relative line segment of the former reference frame when calculating an image shift value of line segment; in other words, taking the characteristic value ($\delta_{i,n,m}$) as the characteristic value ($\delta_{i-1,n,m}$) of the former frame when calculating an image shift value of line segment of the next frame. Referring to FIG. 4D, the characteristic value of the $1^{st}$ line segment of reference frame is replaced by 45. In accordance with the same process described above, calculating characteristic values of each line segment of current frame, which is shown in FIG. 4E. When the image shift value of $2^{nd}$ line segment of current frame is less than the threshold, taking the line segment as a still line segment without displacement and then Weave algorithm is chosen for de-interlacing process in step 340. The de-interlacing method processed by each line segment in FIG. 4E is as shown in current frame in FIG. 4F; in other words, images of current frame in FIG. 4F are constituted according to the de-interlacing method processed by each line segment in FIG. 4E. At this time, the characteristic values of each line segment of reference frame are replaced by the characteristic values of current frame, referring to the diagram of reference frame in FIG. 4F.

During the process of executing de-interlacing process of each line segment of current frame, the player system continuously detects the image information read to see whether it is the end of odd fields and even fields or not. Further, when the image information contains the signal of the field end, then step 380 executes reading of the next frame or stops de-interlacing process. Otherwise, when the image information doesn't contain the signal of the field end, then detecting the image information again to see whether it is the end of the scanning line or not. When the image information is the end of the scanning line, step 360 reads the image information of the next scanning line. Similarly, when the image information is not the end of the scanning line, step 370 reads the image information of the next line segment for processing calculation of characteristic value of the line segment. According to the procedure of the flow chart, de-interlacing process of each line segment of current frame is enforced for acquiring a dynamic image.

Figure 5:
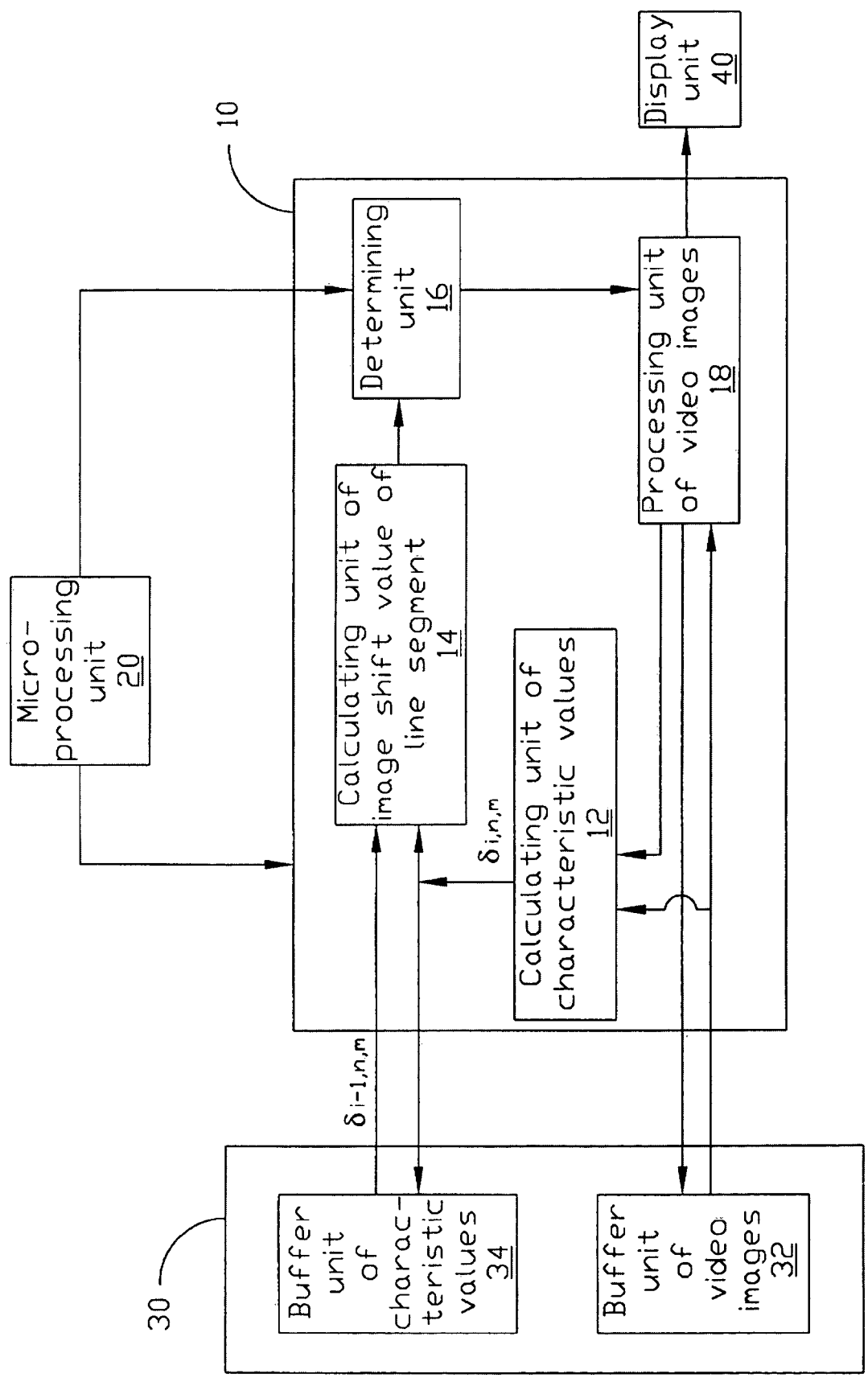
FIG. 5 schematically shows the block chart of executing the adaptive de-interlacing.

In the following one embodiment of an apparatus of adaptive de-interlacing of the present invention is depicted. FIG. 5 schematically shows the block chart of executing the adaptive de-interlacing of the present invention. The apparatus comprises a processing unit of adaptive de-interlacing 10, configured for connecting with a micro-processing unit 20, a memory unit 30 (which includes a buffer unit of video images 32 and a buffer unit of characteristic values 34) and a display unit 40. Moreover, the processing unit of adaptive de-interlacing 10 further comprises a calculating unit of characteristic values 12, a calculating unit of image shift value of line segment 14, a determining unit 16 and a processing unit of video images 18. First, the calculating unit of characteristic values 12 in the processing unit of adaptive de-interlacing 10 receives and reads the image information from the buffer unit of video images 32. Further, the image information in the buffer unit of video images 32 can be saved in the memory unit 30 by the way that saves each motion frame after decoding the image information of disc (for instance, a DVD disc) by an input unit (not shown in FIG. 5). When the calculating unit of characteristic values 12 reads the image information, the micro-processing unit 20 simultaneously delivers a signal with width of a line segment to the processing unit of adaptive de-interlacing 10. It makes the calculating unit of characteristic values 12 in the processing unit of adaptive de-interlacing 10, the calculating unit of image shift value of line segment 14, the determining unit 16 and the processing unit of video images 18 know that how many pixels the width of the line segment is. In the following, the calculating unit of characteristic values 12 executes the calculation of characteristic value of the line segment in accordance with equation 1 and then delivers the calculation result ($\delta_{i,n,m}$) of characteristic value of the line segment to the calculating unit of image shift value of line segment 14. When the calculating unit of image shift values of line segment 14 receives the characteristic value ($\delta_{i,n,m}$) of a line segment of current frame, simultaneously reads the characteristic value ($\delta_{i-1,n,m}$) of the same image position of a reference frame (for instance, a former frame) from the buffer unit of characteristic values 34 in the memory unit 30. Next, sums up the absolute values of difference between the two characteristic values for acquiring an image shift value of line segment and then delivers the image shift value of line segment to the determining unit 16.

After the determining unit 16 receives the signal of the threshold delivered from the micro-processing unit 20, comparing the image shift value of line segment with the threshold and then delivering the comparison result to the processing unit of video images 18. Further, when the processing unit of video images 18 receives the comparison result from the determining unit 16 and it shows that the image shift value of line segment is substantially greater than the threshold, then delivering the image address required of executing de-interlacing at present to the buffer unit of video images 32. Moreover, the contents of the image address include the encoding contents of odd fields and even fields. After the buffer unit of video images 32 delivers the encoding information of each image (from the memory unit 30) to the processing unit of video images 18 in sequence, Bob algorithm is chosen for completing image de-interlacing process of a line segment of current frame. And finally, delivering the processed image to the display unit 40 (for instance, HDTV, PDP or LCD TV) for displaying. On the other hand, the calculating unit of characteristic values 12 saves the characteristic value ($\delta_{i,n,m}$) of current frame (acquired by previous calculation) into the memory unit 30 for being the characteristic value ($\delta_{i-1,n,m}$) of the former frame when calculating an image shift value of line segment of the next frame. In the following, the processing unit of video images 18 delivers the image information (provided from the memory unit 30) to the calculating unit of characteristic values 12 for reading the image information of the next line segment.

On the other hand, when the processing unit of video images 18 receives the comparison result from the determining unit 16 and it shows that the image shift value of line segment is substantially less than the threshold, then delivers the image address required of executing de-interlacing at present to the buffer unit of video images 32. After the buffer unit of video images 32 delivers the encoding information of each image (from the memory unit 30) to the processing unit of video images 18, Weave algorithm is chosen for completing de-interlacing process of a line segment of current frame. And finally, delivering the processed image to the display unit 40 for displaying. Further, when the processing unit of video images 18 is executing de-interlacing process continuously, the image information read from the calculating unit of characteristic values 12 is detected continuously. When contents of the encoding information containing the end of a field are detected, stops de-interlacing process; otherwise, keeping on executing adaptive de-interlacing process of each line segment of next frame.

Since the apparatus of adaptive de-interlacing of the present invention should enforce accessing characteristic values of each line segment, thus it needs the memory (for instance, the buffer unit of characteristic values 34) with enough memory space for accessing the characteristic values. To a frame composed of 720×460 pixels, image resolution of the frame is 331,200 pixels. When taking one pixel as a width of a line segment (i.e. the minimum width of a line segment) for processing adaptive de-interlacing of the present invention, it requires a memory space of 340K Bytes. In the meanwhile, since access of characteristic values uses the replacement method, i.e. reading the characteristic value ($\delta_{i-1,n,m}$) of a line segment of the former frame, acquiring an image shift value ($\delta_{i,n,m}$) of line segment by calculation and then taking the characteristic value of a line segment of current frame as the characteristic value ($\delta_{i-1,n,m}$) of a reference frame when calculating an image shift value of line segment of next frame, therefore, the buffer unit of characteristic values 34 in the apparatus of adaptive de-interlacing of the present invention is adjustable according to the width of a line segment and the maximum is less than the value of frame resolution. However, the space used by the buffer unit of characteristic values 34 is extremely lowcomparing with a memory space of 256M Byte for image processing. Thus, no matter the memory space for processing is provided by the memory unit 30 or is embedded in the processing unit of de-interlacing 10, it won't increase much requirement of hardware and therefore can acquire good performance.

As we all know, smaller the process unit of image of a de-interlacing process, higher the image quality achieved. But respectively, it will increase substantially the number of times of calculation and determination required of de-interlacing process. If de-interlacing process only uses software for processing de-interlacing, delay of image broadcast will occur and therefore produces an unnatural frame. As a result, it should use the rapid access characteristic of the hardware for solving the delay problem of image. The apparatus of the present invention using limited memory space for providing access of characteristic value does not only solve the delay problem of image, but also acquire high-resolution frame of dynamic image.

Moreover, FIG. 5 schematically shows the block diagram of adaptive de-interlacing of the present invention. Although it's divided into different units, but it doesn't indicate that these units (except for the encoding information unit 20 and the display unit 50, configured for input and output respectively) should be devices existing dependently. These units can be configured and combined in accordance with interface specification and requirement of products. For instance, when being used in the high-level image processing workstation or personal computer (PC) being able to broadcast DVD films, the processing unit of de-interlacing 10 can be embedded into CPU of high-level system or be manufactured into an individual device (for instance, a chip) and then connected to CPU. When being used in a player (for instance, a DVD player), the processing unit of de-interlacing 10, the memory unit 30 and the micro-processing unit 40 can be integrated into a chip. As manufacturing of semiconductor develops, SOC (i.e. System on a Chip) technique is also well developed; therefore the processing unit of de-interlacing of the present invention can also be integrated into different application system.

While this invention has been described with reference to illustrative embodiments, this description does not intend or construe in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of adaptive de-interlacing of a dynamic image, comprising:
   calculating a characteristic value of each line segment taking a width of line segment as a process unit of a current frame in sequence in accordance with said width of a line segment taking pixels as a unit;
   calculating an image shift value of line segment in sequence in accordance with said characteristic value of each line segment of said current frame and said characteristic value of each corresponding line segment of a reference frame;
   comparing said image shift value of line segment with a threshold for determining a de-interlacing algorithm of said dynamic image and being a basis of executing de-interlacing process; and
   executing said de-interlacing for constituting output image of said dynamic image.

2. The method according to claim 1, wherein said calculating characteristic value of each line segment of a current frame in sequence further comprises saving said characteristic value for being characteristic values of a former frame when calculating an image shift value of line segment of next frame.

3. The method according to claim 1, wherein said characteristic values of each line segment is sum of absolute values of differences in luminance (Y) of relative pixel position within adjacent lines between two fields in sequence.

4. The method according to claim 1, wherein said reference frame of said current frame is a former frame of said current frame.

5. The method according to claim 1, wherein said image shift value of line segment is absolute value of difference between characteristic values of said current frame and characteristic values of said reference frame.

6. The method according to claim 1, wherein comparing said image shift value of line segment with a threshold, comprising:
  choosing a Bob algorithm for being a basis of de-interlacing process of said dynamic image when said image shift value of line segment is substantially greater than said threshold; and
  choosing a Weave algorithm for being a basis of de-interlacing process of said dynamic image when said image shift value of line segment is substantially less than said threshold.

7. The method according to claim 1, wherein said threshold is a programmable threshold and is adjusted according to requirement of image quality of said dynamic image.

8. A method of determining a de-interlacing of a dynamic image, comprising:
  calculating an image shift value of each line segment of a current frame of said dynamic image to indicate shift extent of each line segment of said dynamic image corresponding to line segment of a reference frame with the same position of pixels; and
  comparing said image shift value of each line segment with a programmable threshold to determine a de-interlacing algorithm applying to each line segment of said dynamic image, wherein choosing a first algorithm for de-interlacing process when said image shift value is substantially greater than said threshold and choosing a second algorithm for de-interlacing process when said image shift value is substantially less than said threshold.

9. The method according to claim 8, wherein said calculating an image shift value of each line segment of said current frame of said dynamic image, comprising:
  calculating a characteristic value of a first line segment in accordance with each line segment of said current frame, wherein said line segment taking pixels as a length unit and is adjustable; and
  getting a absolute value by subtracting said characteristic value of said first line segment from a characteristic value of a second line segment with the same length and pixel position of said reference frame of said current frame for being said image shift value of each line segment of said current frame.

10. The method according to claim 9, wherein said characteristic value of said first line segment and said characteristic value of said second line segment are sum of absolute values of differences in luminance (Y) of the same pixel position of each line segment which has a same width of line segment within adjacent lines between adjacent fields.

11. The method according to claim 9, further comprising storing said characteristic value of said first line segment for being said characteristic value of said second line segment when calculating said image shift value of next frame.

12. The method according to claim 8, wherein said first de-interlacing algorithm is Bob algorithm when said image shift value of line segment is substantially greater than said threshold.

13. The method according to claim 8, wherein said second de-interlacing algorithm is Weave algorithm when said image shift value of line segment is substantially less than said threshold.

14. An apparatus of adaptive de-interlacing of a dynamic image, comprising:
  a calculating unit of characteristic values for receiving a width of a line segment, calculating and outputting said characteristic value of said line segment of a current frame of said dynamic image;
  a calculating unit of image shift value of line segment for receiving said characteristic value of said line segment of said current frame and a characteristic value of corresponding line segment of a reference frame, calculating and outputting said image shift value of line segment;
  a determining unit for receiving and comparing said image shift value of line segment with a threshold and then outputting an information of determination; and
  a processing unit of video images for receiving said information of determination, choosing and executing a de-interlacing algorithm in accordance with said information of determination and then outputting a dynamic image with de-interlacing processed.

15. The apparatus according to claim 14, wherein said calculating unit of characteristic values is configured for obtaining said characteristic values via calculating sum of absolute values of differences in luminance (Y) of the same pixel position of each line segment which has a same width of line segment within adjacent lines between an odd field and an even field.

16. The apparatus according to claim 14, wherein said calculating unit of image shift value of line segment is configured for getting absolute values of differences of said characteristic value of said current frame and said characteristic value of said reference frame corresponding to said current frame for being said image shift value of line segment.

17. The apparatus according to claim 14, wherein said processing unit of video images is configured for choosing a Bob algorithm for de-interlacing process when said image shift value of line segment is substantially greater than said threshold, and choosing a Weave algorithm for de-interlacing process when said image shift value is substantially less than said threshold.

18. The apparatus according to claim 14, further comprising a memory unit for accessing said dynamic image and said characteristic value of line segment.

19. The apparatus according to claim 18, wherein said memory unit comprises:
  a buffer unit of video images for accessing said image information; and
  a buffer unit of characteristic values for accessing said image information and said characteristic value of line segment.

20. The apparatus according to claim 14, further comprising a micro-processing unit for adjusting and providing said width of said line segment and said threshold.

* * * * *